United States Patent [19]

Dery et al.

[11] Patent Number: 4,552,611

[45] Date of Patent: Nov. 12, 1985

[54] CONDUCTOR APPLYING APPARATUS FOR REAR WINDOW DEFROSTERS

[75] Inventors: Normand Dery, Sherbrooke, Canada; Jean-Louis Boudreau, Barton, Vt.

[73] Assignee: Astrolab Inc., St.-Elie d'oxford, Canada

[21] Appl. No.: 526,791

[22] Filed: Aug. 26, 1983

[51] Int. Cl.[4] .......................... B32B 31/04; B44C 7/00

[52] U.S. Cl. ....................................... 156/391; 33/430; 156/71; 156/378; 156/540; 156/574; 156/584; 219/203

[58] Field of Search ................. 156/71, 233, 378, 391, 156/523, 526, 540, 574, 577, 584; 219/203; 33/406, 430, 437, 443, 446

[56] References Cited

U.S. PATENT DOCUMENTS

| | | | |
|---|---|---|---|
| 3,127,683 | 4/1964 | Garton et al. | 33/406 |
| 3,311,982 | 4/1967 | Dalrymple | 33/437 |
| 3,827,468 | 8/1974 | Markham | 33/443 |
| 4,026,757 | 5/1977 | Crawford | 156/577 |
| 4,244,774 | 1/1981 | Dery | 156/574 |
| 4,436,575 | 3/1984 | Dran et al. | 156/391 |

*Primary Examiner*—Michael Wityshyn
*Attorney, Agent, or Firm*—Larson and Taylor

[57] ABSTRACT

An improved hand-held flat conductor applying apparatus for applying to the receiving surface of a glass pane such as the rear window in a motor vehicle, a plurality of equidistant essentially straight lengths of pre-glued flat conductor for defining the heating lines of a rear window resistive defroster. The apparatus uses a confining guide edge of predetermined configuration for setting a datum or base line for the heating lines, a translation carrier mounted to the confining guide edge and confined thereto except for translation therealong, a rigid bar secured to the translation carrier through a suitable pivotable foot and locking means therefore, and a conductor laying head supported to the rigid bar and positioned at anyone of a plurality of predetermined points along the rigid bar. The translation carrier is mounted to the confining guide edge by means of two widely spaced apart pairs of rollers which are suitably offset to prevent binding of the translation carrier when moving along the guide edge, and the guide edge is configured so as to present a flat main body having a top edge, and a T-shaped flange extending along the top edge and adapted to receive, on either sides thereof, the carrier rollers. The conductor laying head is of simple construction using a single pressure roller in the region of a glass engaging crescent which is nearest the receiving surface of the glass pane, and the mounting means for the conductor laying head relative to the rigid bar is such as to prevent rotation of the head about the axis of the rigid bar.

11 Claims, 10 Drawing Figures

CONDUCTOR APPLYING APPARATUS FOR REAR WINDOW DEFROSTERS

Figure 2:
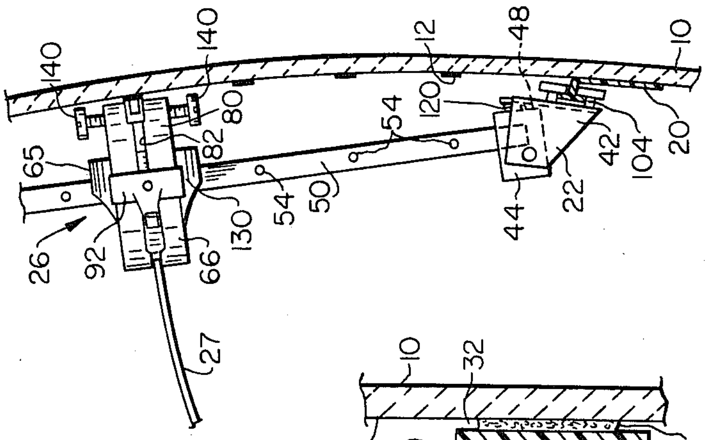

This invention relates to the art of after market rear window resistive defroster installation, and in particular to a novel hand-held flat conductor applying apparatus being an improvement over the devices disclosed in U.S. Pat. No. 4,244,774 issued Jan. 13, 1981 for an invention of Normand Dery, a co-inventor hereof.

In view of the importance to have a rear window defroster in every motor vehicle, which is now generally regarded as an essential safety feature, the demand for after market resistive defrosters is ever increasing practically throughout the world. The success of the solid copper flat conductor resistive defroster disclosed in my above-noted prior patent has caused some new car dealers and consumers to prefer a flat conductor resistive defroster over factory installed resistive defrosters on account of the inherent fragility and lack of reliability of the latter, thus further increasing the demand for resistive defrosters using flat conductors of solid copper or copper alloys.

The art of resistive defroster installation in the case of a motor vehicle is not really comparable to any other area of activity and drafting instruments such as used for applying masking tape or marking tape (see for example U.S. Pat. Nos. 1,739,296 to DUPONT dated Dec. 10, 1929, 2,904,206 to Bertschinger dated Sept. 15, 1959 and 3,150,027 to Moyer dated Sept. 22, 1964) are not adaptable to such use; neither are the instruments for applying conductive tapes in safety systems such as illustrated in U.S. Pat. Nos. 3,829,347 to Honea dated Aug. 13, 1974, 4,022,651 to Larkins dated May 10, 1977 and 4,026,757 to Crawford dated May 31, 1977.

When proceeding to install the successive flat conductor against the inside surface of a rear window in a car, the operator works within a relatively small enclosure and the receiving surface is nearly always curved; the heating lines of the finished resistive defroster must provide a neat appearance requiring a strictly parallel lines arrangement which is symetrical about the center of the rear window and which is essentially horizontal when viewed from the outside. The equipment to be used must afford ease of manipulation and permit the laying of the various flat conductors in just a few seconds otherwise the cost of labour makes the product prohibitive. The equipment must be compatible with the various shapes and sizes of rear windows and adapt itself readily to the different curvatures thereof. Thus, specialized tools were developed for this purpose as shown in the above-noted U.S. patent to Normand Dery, which tools perform adequately when used by skilled labour. Unfortunately the tools in question are expensive to produce and the quality of the finished work was found to be overly dependent upon the skill and care of the individual operators.

The main object of the present invention is to provide a hand-held flat conductor applying apparatus for applying to the receiving surface of a glass pane a plurality of equidistant, essentially straight, lengths of pre-glued flat conductor defining the heating lines of a rear window resistive defroster which is cheaper to produce than those illustrated in U.S. Pat. No. 4,244,774 and which may be used more easily with less risks of imperfect lines.

In accordance with this invention we provide, in combination, a confining guide edge for setting a datum line for the heating lines, a conductor laying head, a translation carrier having carrier roller means for mounting the carrier on the confining guide edge to enable translation of the carrier along the confining guide edge while maintaining a positive connection between the two, a rigid bar rigidly secured to the translation carrier in a perpendicular relationship to the confining guide edge for retaining the laying head and indexing means on the rigid bar for supporting the head in anyone of a plurality of regularly spaced apart points along the rigid bar thereby setting the spacing of the heating lines. The translation carrier preferably has a guide follower, a pivotal foot for the rigid bar, a pivotal connection between the pivotal foot and the guide follower, and locking means for the pivotal connection for maintaining the pivotal foot and the rigid bar thereon in a predetermined upright position relative to the guide follower during application of any length of flat conductor. The confining guide edge has groove means for confining the guide follower against all motions except translation therealong.

We prefer to use a confining guide edge in the form of a flat main body having an upper edge along which extends a T-shaped flange, and a translation carrier whose carrier roller means consists of two widely spaced apart pairs of rollers riding along the T-shaped flange and equidistant from the rigid bar. Preferably, the rollers, in each pair, are offset in a vertical direction to prevent binding of the translation carrier when moving along the confining guide edge.

A preferred form of conductor laying head has a slide and a glass-engaging crescent with a single pressure roller. The glass-engaging crescent may be made from a disc-shaped piece of light alloy into which a deep and wide radial socket is made for receiving the slide, which slide fits closely within the radial socket and is moveable along the socket; the conductor laying head may have key means to prevent rotation of the slide relative to the glass-engaging crescent and a set screw to set the position of the slide relative to the radial socket. An arcuate conductor receiving groove extends along the curved face of the glass-engaging crescent, a lead roller is disposed into the conductor receiving groove near one end of the groove, a stripping blade is laid over the lead roller, a conductor alignment guide into the conductor receiving groove near the other end thereof is located a short distance upstream from the pressure roller, and I use a stabilizer leg on either side of the pressure roller to provide lateral stability to the conductor laying head. Transverse pins are used to keep the conductor into the groove.

Another aspect of the present invention is a novel guide edge member for setting a datum line for a parallel line making instrument over a curved surface which comprises an elongated flat main body having a top edge and a T-shaped flange integrally formed along the top edge, the guide edge member presenting considerable resistance to bending in the plane of its main body and much less transversally thereof. We prefer to use such a guide edge member which is made by plastic extrusion. In certain applications it becomes necessary to curve the guide edge member in the plane of its main body and to this effect we use a guide edge member which has a series of uniformally distributed transverse slots of equal depth through the main body below the top edge thereof. This guide edge member is adapted to be secured against the receiving surface of the glass pane by means of any convenient adhesive or securing means and we prefer to use patches of pressure sensitive adhesive available in the trade and formed of a flat body of material presenting two opposite adhesive surfaces.

Figure 3B:
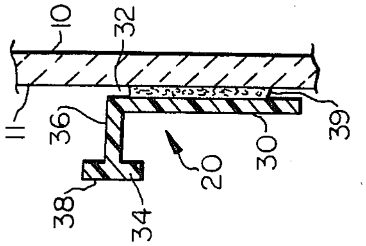
Figure 1:
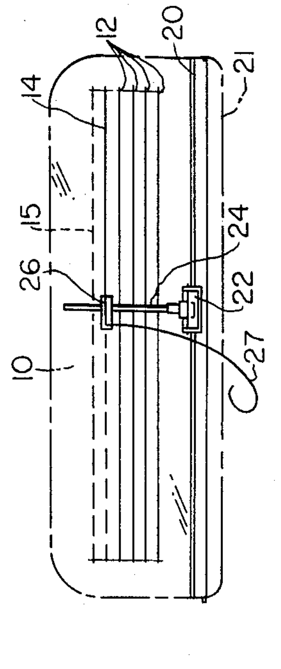
Figure 3A:
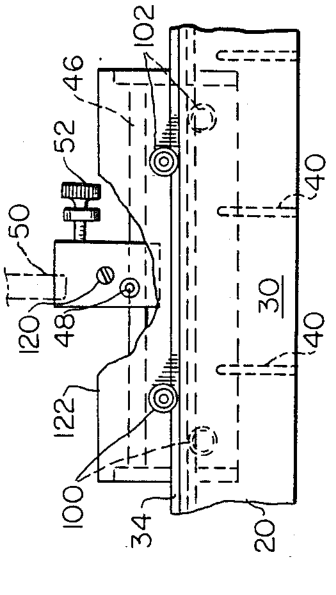
Figure 6C:
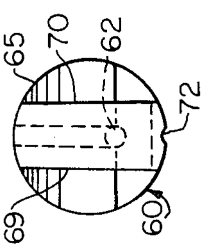
Figure 6B:
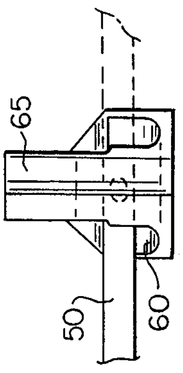
Figure 6A:
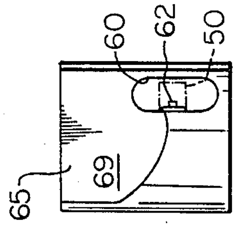
Figure 5B:
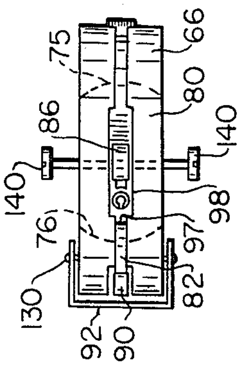
Figure 4:
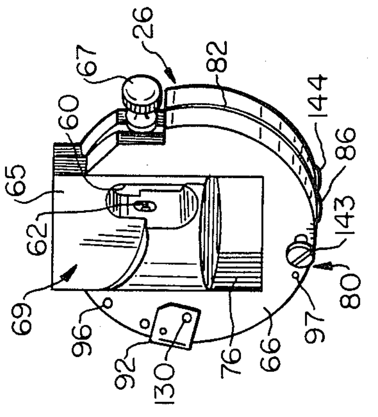
Figure 5A:
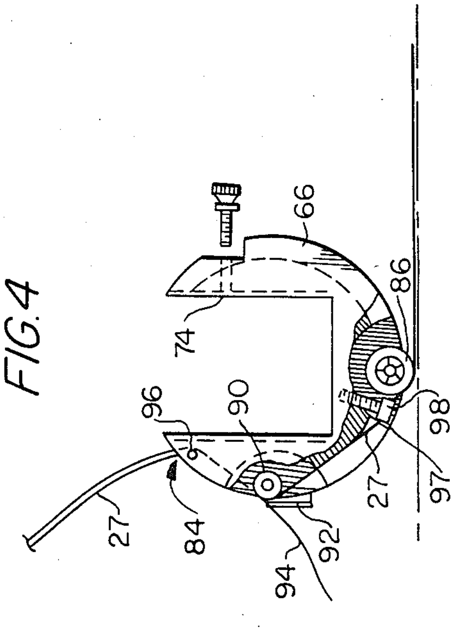

These and other features of the present invention will become apparent from a reading of the following detailed description of a preferred embodiment of the invention given with reference to the accompanying drawings wherein:

FIG. 1 is a front elevational view of a typical rear window on which flat conductors are being laid using an apparatus in accordance with this invention, FIG. 2 is a side elevational view through a typical rear window showing a preferred form of the apparatus according to this invention, FIG. 3A is a front elevational view of a section of a confining guide edge according to this invention with a partial illustration of a preferred form of translation carrier, FIG. 3B is a side cross-sectional view through a glass pane showing the preferred cross-section of a confining guide edge, FIG. 4 is a perspective view of a preferred conductor laying head according to this invention, FIG. 5A is a plan view of a glass engaging crescent, FIG. 5B is a front elevational view of the crescent shown in FIG. 5A, FIG. 6A is a side elevational view of a slide for the crescent of FIGS. 5A and B, FIG. 6B is a side elevation of the slide of FIG. 6A, and FIG. 6C is a plan view of the slide of FIGS. 6A and 6B.

Referring now to the drawings, a typical rear window 10 is shown to which four flat conductors 12 have been installed and to which a fifth one is in the process of being installed as at 14, using an apparatus which, in accordance with this invention, comprises a confining guide edge 20 temporarily secured adjacent the bottom edge 21 of window 10 so as to establish a datum line for the heating lines 12, 14 and 15 of a typical resistive defroster. The apparatus also includes a translation carrier 22, a rigid bar 24 and a conductor laying head 26 for applying on the receiving surface (inside surface) of rear window 10 a flat conductor 27 as translation carrier 22 moves along the above-noted guide edge 20.

Guide edge 20 is better illustrated in FIGS. 3A and 3B. It has a flat main body 30 whose top edge 32 comprises an integrally formed perpendicular T-shaped flange 34 which defines a track for the conductor laying instrument. The flat main body 30 is sufficiently wide to resist bending in the plane of flat main body 30 and it may be relatively thin so as to easily adapt to the curvature of the rear window glass pane 10. Transverse bending of guide edge member 20 is therefore considerably less in spite of the presence of T-shaped flange 34 which also is thin walled. In a preferred form, guide edge member 20 is a plastic extrusion, for example PVC, and according to a typical construction, the constant height of flat main body 30 is 25 mm while its thickness is 1 mm. The T-shaped flange has a neck portion 36 measuring about 4 mm and the transverse bar 38 is about 3 mm in height, the thickness of the T-shaped flange 34 being also roughly 1 mm.

Guide edge member 20 may be temporarily secured against the inside surface 11 of glass pane 10 by means of a double sided adhesive 39 compatible with glass and the type of material of which edge member 20 is made. For curved and slanted rear windows, transverse curving of guide edge 20 may be required and for this purpose I provide a series of regularly spaced apart slots through the flat main body 30 as shown in dotted lines in FIG. 3A as at 40. Slots 40 extend through flat main body 30 from the bottom edge thereof and terminate short of the upper edge 32.

Translation carrier 22 comprises a guide follower 42 to which is pivotally mounted a portable foot 44 via pivot rod 46, and a locking detent 48 in the form of a plunger ball, i.e. spring loaded ball, encased into pivotable foot 44 and coacting with a corresponding hemispherical cavity in guide follower 42 ensures a predetermined angular position of pivotal foot 44 relative to its base 42.

A rigid bar 50 is secured to pivotable foot 44 by any suitable means such as screw 52, and rigid bar 50 has a plurality of index marks 54 along one side thereof corresponding to the desired spacing between flat conductors 12 as better shown in FIG. 2. Since the heating line spacing is not always the same in the various resistive defroster installations, various rigid bars 50 having different spacings between indexing sockets 54 should be made available to the operator.

Rigid bar 50 supports a conductor laying head. The illustrated laying head 26 is one which should not be allowed to turn around the longitudinal axis of rigid bar 50 and to this effect rigid bar 50 is of square cross-section. A preferred form of receiving passageway for bar 50 is shown at 60 (see FIGS. 4 and 6A). It is essentially oblong with two facing walls slightly exceeding the corresponding size of rigid bar 50 for proper relative movement longitudinally of rigid bar 50. A ball plunger 62 in one of the two walls in passageway 60 engages any one of the plurality of index marks 54 along rigid bar 50.

The conductor laying head 26 illustrated in FIGS. 2 and 4 to 6C comprises a slide 65 and a glass-engaging crescent 66 slidably connected to slide 65 and lockable in any given relative position by means of screw 67. In a convenient embodiment of the present conductor laying head 26, slide 65 is made from a cylindrical piece of light metal such as aluminum whose rear portion is flattened on both sides as at 69 and 70 in order to facilitate manipulation of conductor laying head 26 by the operator. A passageway 60 of sufficient height is drilled for receiving rigid bar 50 and for allowing limited pivotal motion (about the axis defined by plunger ball 62) of some 15 to 20 degrees on each side of the central position to ensure that the glass engaging crescent 66 has enough freedom to assume a perpendicular position relative to the glass pane 10 throughout the process of laying a length of flat conductor such as at 27. Oblong passageway 60 may be offset in order to facilitate visual control of the proper conductor application by the operator. Slide 65 also includes a keyway 72 which engages with a corresponding key (not shown) in glass engaging crescent 66. Crescent 66 is made from a disc-shaped piece of light metal such as aluminum into which a relatively wide and deep radial socket is drilled as at 74 leaving arcuate walls 75 and 76 which receive slide 65; arcuate wall 75 comprising the above-noted key which rides into keyway 72 to prevent relative rotation about the longitudinal axis of slide 65. Stabilizer legs 140 on either side of pressure roller 86 assist the operator in maintaining the conductor laying head 26 perpendicular to glass pane 10. Small rollers (not shown) are preferred but non rolling bosses at the ends of legs 140 work satisfactorily, (see for example the two small screws 143,144 shown in FIG. 4).

The front face of glass engaging crescent 66 is shown in FIGS. 2, 4 and 5B at 80. It comprises a relatively deep arcuate groove 82 of sufficient extent for proper guiding and positioning of flat conductor 27 from its point of entry 84 to pressure roller 86. In a preferred embodiment, groove 82 extends fully around crescent 66 in a circular arrangement co-centric with the disc-shaped body of crescent 66. A first transverse pin 96 retains the flat conductor 27 and its protective film inside groove 82, Lead roller 90 is located into groove 82 immediately behind stripping blade 92 which is used for separating the protective film from the pre-glued surface of flat conductor 27. This protective film is visible in FIG. 5A at 94. We prefer to use a stripping blade 92 which is pivotable such as at 130 to facilitate insertion of conductor 27 over lead roller 90. A second transverse pin 97 (FIGS. 5A and 5B) maintains the flat conductor 27 within groove 82 near pressure roller 86. An aligning device 98 is disposed a very short distance upstream from pressure roller 86 and it is used for accurately guiding flat conductor 27 as it reaches pressure roller 86. Aligning device 98 is provided with a groove which receives flat conductor 27 with very little lateral play. It is subject to wear and consequently a preferred form of aligning device 98 is a cap screw with a groove cut across its cap portion as better shown in FIGS. 5A and 5B. Lead roller 90 and pressure roller 86 are preferably small ball bearing rollers.

In a typical embodiment, the transverse dimension of glass engaging crescent 66 is about 40 mm and its thickness is about 12 mm while the length of slide 65 is 25 mm using, as starting material, a cylindrical aluminum block whose diameter is also 25 mm.

The above described conductor laying head 26 is of simple construction, it works well and it is relatively cheap to manufacture. It has only one pressure roller and consequently, its supporting bar 50 is preferably of rectangular or square cross-section. It should be understood, however, that other head constructions could be used in conjunction with the confining guide edge and the translation carrier of the present invention. Should there be two pressure rollers, instead of one as at 86, a rigid bar of round cross-section should normally be used in order to permit rotation of the conductor laying head relative to its supporting structure as it follows the curvature of the receiving surface of the glass pane 10.

Reverting again to FIGS. 2 and 3A, a preferred form of connection of translation carrier 22 and confining guide edge 20 consists of two widely spaced apart pairs 100 and 102 of rollers secured to the back surface of guide follower 42 by means of parallel pins 104 which are just long enough to clear the thickness of bar 38 of T-shaped flange 34 of confining guide edge 20. The rollers in each pair 100,102 are disposed on either side of an imaginary line along which the neck portion 36 of guide edge 20 extends, and they are offset in the direction perpendicular to that of guide edge 20 so as to avoid binding of translation carrier 22 as it moves along guide edge 20. This offset configuration was found to reduce the need for accurate vertical spacing of the rollers in each pair thereof 100,102. This vertical or perpendicular spacing should be just slightly greater than the thickness of neck portion 36, and the width of transverse bar 38 of guide edge 20 should be less than the vertical space between the pins 104 of the rollers in each pair of rollers 100,102 for proper clearance. Pairs 100,102 are preferably equidistant from rigid bar 50.

Thus, the translation carrier 22 is retained to guide edge 20 by means of pairs of rollers 100,102 on T-shaped flange 34, rigid bar 50 is secured to pivotable foot 44 and is maintained in an upright position, as shown in FIG. 2 by virtue of locking detent 48 in in translation carrier 22. If required, an adjustable limit abutment 120 on pivotable foot 44 bearing against guide follower 42 just below top edge 122 determines with more accuracy, the required angular relationship of rigid bar 50 and the receiving surface of glass pane 10. A self-locking cap screw 120 was found to be adequate for this purpose.

In operation, the operator positions flat conductor 27 at its starting point on a given line (12, 14 or 15) and then he moves head 26 sideways along guide edge 20 in one smooth pass while gently urging the conductor laying head 26 towards glass pane 10 to ensure sufficient adhesion of the conductor 27 onto the receiving surface of glass pane 10. With this apparatus, which was found to be very cheap to manufacture, a typical operator with practically no prior experience was found to be able to achieve excellent heating line configurations repeatably.

It was also determined that confining guide edge 20 can be produced commercially at a cost of a few cents per foot using ordinary plastic extrusion techniques. Hence, it a typical operator's kit, ten to fifteen lengths of guide edge 20 are included to be cut to size by the operator to suit his clients' particular types of vehicles.

Various modifications can be made to the preferred embodiment described above without departing from the scope of the present invention which is defined in the following claims.

I claim:

1. A hand-held flat conductor applying apparatus for applying to the receiving surface of a curved glass pane, namely the rear window in a motor vehicle or the like, a plurality of equidistant, essentially straight, lengths of pre-glued flat conductor defining the heating lines of a rear window resistive defroster, comprising, in combination, a confining guide edge temporarily affixed to and following the curvature of said receiving surface for setting a datum line for said heating lines, said confining guide edge being an elongated thin strip of suitably flexible material having a T-shaped flange defining a track and extending along said elongated thin strip and being perpendicular thereto, a conductor laying head through which passes said length of flat conductor being applied to said receiving surface, a translation carrier engaging said confining guide edge to enable translation of said translation carrier along said confining guide edge, a rigid bar mounting said conductor laying head to said translation carrier, means on said rigid bar supporting said conductor laying head at any one of a plurality of regularly spaced apart points along said rigid bar thereby setting the desired spacing of said heating lines in said rear window resistive defroster, and connecting means detachably coupling said translation carrier to said confining guide edge and promoting smooth translatory motion of said translation carrier and of said rigid bar thereon along said confining guide edge to ensure parallelism of said heating lines and wherein said connecting means comprises a set of small rollers on said translation carrier riding along opposite sides of said track for smooth translation along said confining guide edge and for detachably connecting said translation carrier to said track.

2. Apparatus as defined in claim 1 wherein said set of small rollers comprises two spaced apart pairs of small rollers freely rotatable around parallel pins secured to said translation carrier, the rollers in each pair being disposed on opposite sides of said track and offset in a direction perpendicular to that of said track to prevent binding of said translation carrier when moving along said confining guide edge.

3. Apparatus as defined in claim 2 wherein said translation carrier consists of a guide follower, a pivotable foot affixed to said rigid bar, a pivotal connection between said pivotable foot and said guide follower around an axis parallel to said confining guide edge and maintaining said pivotable foot and said rigid bar thereon in a predetermined upright position relative to said guide follower and to said confining guide edge during application of any said length of said flat conductor.

4. Apparatus as defined in claim 1 wherein said conductor laying head comprises a slide and a glass-engaging crescent, said glass-engaging crescent being made from a disc-shaped piece of light alloy into which a deep and wide radial socket is made for receiving said slide, said slide fitting closely within said radial socket and being moveable along said socket; said conductor laying head having means to adjustably set the position of said slide along said radial socket, an arcuate conductor receiving groove extending along at least part of the region of said glass-engaging body crescent opposite said slide, a first transverse pin bridging said conductor receiving groove for receiving and guiding said conductor thereinto, a lead roller in said conductor receiving groove, a stripping blade over said lead roller, a pressure roller, a second transverse pin bridging said conductor receiving groove between said lead roller and said pressure roller to maintain said conductor in said conductor alignment groove, and a stabilizer leg on either side of said glass-engaging crescent.

5. Apparatus as defined in claim 1 wherein said conductor laying head comprises a slide and a glass-engaging crescent, said glass-engaging crescent being made from a disc-shaped piece of light alloy into which a deep and wide radial socket is made for receiving said slide, said slide fitting closely within said radial socket and being moveable along said socket; said conductor laying head having means to adjustably set the position of said slide along said radial socket, an arcuate conductor receiving groove extending along at least part of the region of said glass-engaging body crescent opposite said slide, a first transverse pin bridging said conductor receiving groove for receiving and guiding said conductor thereinto, a lead roller in said conductor receiving groove, a stripping blade over said lead roller, a pressure roller, a second transverse pin bridging said conductor receiving groove between said lead roller and said pressure roller to maintain said conductor in said conductor alignment groove, and a stabilizer leg on either side of said glass-engaging crescent and wherein said rigid bar is of square cross-section, has shallow recesses along its length to locate said conductor laying head and extends through an oblong passageway across said slide which incorporates a spring loaded retractable ball for seating into any one of said shallow recesses.

6. A hand-held flat conductor applying apparatus for applying to the receiving surface of a glass pane a plurality of equidistant, essentially straight, lengths of preglued flat conductor defining the heating lines of a rear window resistive defroster, comprising, in combination, a confining guide edge for setting a datum line for said heating lines, a conductor laying head through which passes the length of flat conductor being applied to said receiving surface, a translation carrier having carrier roller means for mounting to said confining guide edge to enable translation of said carrier along said confining guide edge, a rigid bar rigidly secured to said translation carrier in a perpendicular relationship to said confining guide edge for holding said conductor laying head, and indexing means on said rigid bar for locating said conductor laying head at any one of a plurality of regularly spaced apart points along said rigid bar thereby setting the spacing of said heating lines of said rear window resistive defroster, said confining guide edge having track means engaged by said carrier roller means for confining said translation carrier against all motions except translation along said confining guide edge, wherein said track means of said confining guide edge is a T-shaped flange extending along the top of said confining guide edge and wherein said carrier roller means consists of two widely spaced apart pairs of rollers riding along said T-shaped flange and equidistant from said rigid bar, the rollers in each pair being positioned on opposite sides of said T-shaped flange, and wherein said rollers of each pair of rollers are offset in a direction transverse to the confining guide edge thereby to prevent binding of said translation carrier when moving along said confining guide edge.

7. A hand-held flat conductor applying apparatus for applying to the receiving surface of a glass pane a plurality of equidistant, essentially straight, lengths of preglued flat conductor defining the heating lines of a rear window resistive defroster, comprising, in combination, a confining guide edge for setting a datum line for said heating lines, a conductor laying head through which passes the length of flat conductor being applied to said receiving surface, a translation carrier having carrier roller means for mounting to said confining guide edge to enable translation of said carrier along said confining guide edge, a rigid bar rigidly secured to said translation carrier in a perpendicular relationship to said confining guide edge for holding said conductor laying head, and indexing means on said rigid bar for locating said conductor laying head at any one of a plurality of regularly spaced apart points along said rigid bar thereby setting the spacing of said heating lines of said rear window resistive defroster, said confining edge having track means engaged by said carrier roller means for confining said translation carrier against all motions except translation along said confining guide edge, and wherein said conductor laying head comprises a slide and a glass-engaging crescent, said glass-engaging crescent being made from a disc-shaped piece of light alloy into which a deep and wide radial socket is made for receiving said slide, said slide fitting closely within said radial socket and being moveable along said socket; wherein said conductor laying head has keying means to prevent rotation of said slide relative to said glass-engaging crescent, set screw means to fix the position of said slide relative to said radial socket, an arcuate conductor receiving groove extending along the curved face of said glass-engaging crescent, a first transverse pin to guide said conductor into said conductor receiving groove, a lead roller in said conductor receiving groove, a stripping blade over said lead roller, a single pressure roller, a conductor alignment guide in said conductor receiving groove a short distance upstream from said pressure roller, a second transverse pin to maintain said conductor in said conductor alignment guide, and a stabilizer leg on either side of said pressure roller.

8. A hand-held flat conductor applying apparatus for applying to the receiving surface of a glass pane a plurality of equidistant, essentially straight, lengths of pre-glued flat conductor defining the heating lines of a rear window resistive defroster, comprising, in combination, a confining guide edge for setting a datum line for said heating lines, a conductor laying head through which passes the length of flat conductor being applied to said receiving surface, a translation carrier having carrier roller means for mounting to said confining guide edge to enable translation of said carrier along said confining guide edge, a rigid bar rigidly secured to said translation carrier in a perpendicular relationship to said confining guide edge for holding said conductor laying head, and indexing means on said rigid bar for locating said conductor laying head at any one of a plurality of regularly spaced apart points along said rigid bar thereby setting the spacing of said heating lines of said rear window resistive defroster, said confining guide edge having track means engaged by said carrier roller means for confining said translation carrier against all motions except translation along said confining guide edge, wherein said translation carrier consists of a guide follower, a pivotable foot affixed to said rigid bar, a pivotal connection between said pivotable foot and said guide follower around an axis parallel to said confining guide edge and locking means for said pivotal connection for maintaining said pivotable foot and said rigid bar thereon in a predetermined upright position relative to said guide follower and to said confining guide edge during application of any length of said flat conductor, and wherein said track means of said confining guide edge is a T-shaped flange extending along the top of said confining guide edge and wherein said carrier roller means consists of two widely spaced apart pairs of rollers riding along said T-shaped flange and equidistant from said rigid bar, the rollers in each pair being positioned on opposite sides of said T-shaped flange, and wherein said rollers of each pair of rollers are offset in a direction transverse to the confining guide edge thereby to prevent binding of said translation carrier when moving along said confining guide edge.

9. A hand-held flat conductor applying apparatus for applying to the receiving surface of a glass pane a plurality of equidistant, essentially straight, lengths of pre-glued flat conductor defining the heating lines of a rear window resistive defroster, comprising, in combination, a confining guide edge for setting a datum line for said heating lines, a conductor laying head through which passes the length of flat conductor being applied to said receiving surface, a translation carrier having carrier roller means for mounting to said confining guide edge to enable translation of said carrier along said confining guide edge, a rigid bar rigidly secured to said translation carrier in a perpendicular relationship to said confining guide edge for holding said conductor laying head, and indexing means on said rigid bar for locating said conductor laying head at any one of a plurality of regularly spaced apart points along said rigid bar thereby setting the spacing of said heating lines of said rear window resistive defroster, said confining guide edge having track means engaged by said carrier roller means for confining said translation carrier against all motions except translation along said confining guide edge, wherein said translation carrier consists of a guide follower, a pivotable foot affixed to said rigid bar, a pivotal connection between said pivotable foot and said guide follower around an axis parallel to said confining guide edge and locking means for said pivotal connection for maintaining said pivotable foot and the rigid bar thereon in a predetermined upright position relative to said guide follower and to said confining guide edge during application of any length of said flat conductor, and wherein said conductor laying head comprises a slide and a glass-engaging crescent, said glass-engaging crescent being made from a disc-shaped piece of light alloy into which a deep and wide radial socket is made for receiving said slide, said slide fitting closely within said radial socket and being moveable along said socket; wherein said conductor laying head has keying means to prevent rotation of said slide relative to said glass-engaging crescent, set screw means to fix the position of said slide relative to said radial socket, an arcuate conductor receiving groove extending along the curved face of said glass-engaging crescent, a first transverse pin to guide said conductor into said conductor receiving groove, a lead roller in said conductor receiving groove, a stripping blade over said lead roller, a single pressure roller, a conductor alignment guide in said conductor receiving groove a short distance upstream from said pressure roller, a second transverse pin to maintain said conductor in said conductor alignment guide, and a stabilizer leg on either side of said pressure roller.

10. A hand-held flat conductor applying apparatus for applying to the receiving surface of a glass pane a plurality of equidistant, essentially straight, lengths of pre-glued flat conductor defining the heating lines of a rear window resistive defroster, comprising, in combination, a confining guide edge for setting a datum line for said heating lines, a conductor laying head through which passes the length of flat conductor being applied to said receiving surface, a translation carrier having carrier roller means for mounting to said confining guide edge to enable translation of said carrier along said confining guide edge, a rigid bar rigidly secured to said translation carrier in a perpendicular relationship to said confining guide edge for holding said conductor laying head, and indexing means on said rigid bar for locating said conductor laying head at any one of a plurality of regularly spaced apart points along said rigid bar thereby setting the spacing of said heating lines of said rear window resistive defroster, said confining guide edge having track means engaged by said carrier roller means for confining said translation carrier against all motions except translation along said confining guide edge, and wherein said rigid bar is essentially of square cross-section wherein said indexing means is a plurality of shallow recesses along one side of said rigid bar and wherein said coupling means is the combination of two facing walls in an oblong passageway through said conductor laying head and of a spring loaded retractable ball projecting through one of said walls for seating into any one of said shallow recesses when said rigid bar extends through said passageway, and wherein said conductor laying head comprises a slide and a glass-engaging crescent, said glass-engaging crescent being made from a disc-shaped piece of light alloy into which a deep and wide radial socket is made for receiving said slide, said slide fitting closely within said radial socket and being moveable along said socket; wherein said conductor laying head has keying means to prevent rotation of said slide relative to said glass-engaging crescent, set screw means to fix the position of said slide relative to said radial socket, an arcuate conductor receiving groove extending along the curved face of said glass-engaging crescent, a first transverse pin to guide said conductor into said conductor receiving groove, a lead roller in said conductor receiving groove, a stripping blade over said lead roller, a single pressure roller, a conductor alignment guide in said conductor receiving groove a short distance upstream from said pressure roller, a second transverse pin to maintain said conductor in said conductor alignment guide, and a stabilizer leg on either side of said pressure roller.

11. A guide edge member for setting a datum line for an apparatus applying defrosting conductors to the receiving surface of a rear window in a motor vehicle or the like, said guide edge comprising an elongated thin strip of suitably flexible material and an integral T-shaped flange at right angle to and extending along said elongated thin strip, said T-shaped flange defining a confining track for maintaining in an upright position a conductor applying instrument and for guiding same in a translatory motion across said rear window, the guide edge member presenting considerable resistance to bending in the plane of its main body and much less transversally thereof.

* * * * *